Patented Dec. 23, 1952

2,623,056

UNITED STATES PATENT OFFICE 2,623,056

DRYING OILS AND PROCESS FOR MAKING THE SAME

William E. Elwell, Berkeley, Calif., assignor to California Research Corporation, San Francisco, Calif., a corporation of Delaware No Drawing. Application May 31, 1949, Serial No. 96,395

16 Claims. (Cl. 260—404.8)

This invention relates to the manufacture of new organic compounds. More particularly, it relates to the manufacture of improved drying oils from certain polyhydric alcohols, monocarboxylic unsaturated fatty acids and cyclic polycarboxylic acids having at least four carboxyl groups in a molecule or their anhydrides. Still more particularly, it relates to the production of improved drying oils by modifying drying and semi-drying oils, so as to yield oils drying faster than, or at least as fast as, the conventional, natural full-drying oils.

In the art of protective surface-coatings, such as paints and varnishes, discovery and development of new types of inexpensive oils capable of drying to a tack-free, hard, water-resistant film in a minimum of time are of the primary importance.

Therefore, one of the chief objects of this invention is to provide improved drying oils which will dry as quickly, or even quicker, than the well-known natural full-drying oils, such as linseed oil.

Another object of the invention is to provide improved drying oils by modifying semi-drying oils in such a manner as to secure oils comparable or superior in their drying properties to full-drying oils.

Still another object of invention is to provide improved drying oils capable of forming especially hard, water-resistant films when applied in surface-coatings.

Other objects of the invention will become apparent from the description which follows.

I have now found that the aforementioned improved drying oils are provided by monomeric neutral esters of a cyclic polycarboxylic acid, having the general formula $A(COOY)_n$ wherein A is the residue of said polycarboxylic acid, Y is the radical of a monomeric monohydric polyester of a polyhydric alcohol having at least three hydroxyl groups per molecule, and in which all but one of the hydroxyl groups have been esterified by monocarboxylic unsaturated fatty acids containing from 16 to 18 carbon atoms per molecule, while $n$ is an integer of at least 4.

In the following description of my invention and in the claims, the term "monohydric polyester" will designate the product of esterification of a polyhydric alcohol having at least 3 hydroxyl groups with a monocarboxylic unsaturated fatty acid, which product contains but one free hydroxyl group.

These neutral monomeric esters of cyclic polycarboxylic acids of my invention may be prepared by either of the two methods:

(a) Direct esterification of a polyhydric alcohol by a monocarboxylic unsaturated fatty acid, or acids, to an ester, or esters, containing but one hydroxyl group, followed by the reaction of this ester with a cyclic polycarboxylic acid having at least four carboxyl groups in a molecule;

(b) Alcoholysis or ester interchange of triglycerides constituting a drying or a semi-drying oil with a polyhydric alcohol having at least three hydroxyl groups, yielding a mixture of esters of monocarboxylic unsaturated fatty acids and polyhydric alcohol, followed by the separation of a monomeric monohydric polyester from this mixture of esters, and by the reaction of this monohydric polyester with a cyclic polycarboxylic acid having at least four carboxyl groups in a molecule.

In the preparation of neutral monomeric esters of cyclic polycarboxylic acids of the present invention by the direct esterification method, a monocarboxylic unsaturated fatty acid, such as may be recovered from various drying or semi-drying oils of vegetable or animal origin, e. g., linoleic acid, is reacted with a polyhydric alcohol having at least three hydroxyl groups by heating the reactants in a mol ratio of at least 2 mols of the fatty acid per 1 mol of the alcohol at a temperature which may vary from about 200° C. to about 250° C. until about the theoretical amount of water has evolved, leaving a product essentially consisting of monohydric polyesters of polyhydric alcohol as a single homogeneous phase. The presence of a catalyst for this reaction is not required, although basic catalysts, such as sodium hydroxide or litharge in amounts ranging from 0.01 to 0.1% by weight of the total reactants may be used, whenever desired, to speed up the reaction. The monohydric polyester product is then combined with a cyclic polycarboxylic acid having at least four carboxyl groups, preferably applied in the form of anhydride, in stoichiometrical amounts, so that the total number of carboxyl groups of the acid in the mixture will be equal to, or will be slightly less than, the number of hydroxyl groups available in the monohydric polyester. The mixture is cooked at about 200° to about 250° C. until evolution of water (as steam) ceases, indicating completion of the reaction and formation of a monomeric, neutral polyester containing at least eight unsaturated fatty acid radicals per molecule.

Among the polyhydric alcohols having at least three hydroxyl groups in the molecule and suitable for the hereindescribed esterification, are included glycerol, pentaerythritol, dipentaerythritol, sorbitol, mannitol, and various polyallyl alcohols.

Among the various cyclic polycarboxylic acids having at least four carboxyl groups per molecule, the aromatic tetracarboxylic acids, including both mononuclear and polynuclear aromatic tetracarboxylic acids and their anhydrides, are particularly suitable for the production of neutral monomeric polyesters in accordance with the invention. Dianhydride-forming cyclic polycarboxylic acids, e. g., pyromellitic acid, are preferred.

Substituted cyclic polycarboxylic acids with at least four carboxyl groups per molecule which contain substituents inert under the conditions of reaction between the polycarboxylic acid and the monohydric polyesters, e. g., aromatic acids containing one or more alkyl groups, etc., may likewise be employed in the preparation of neutral monomeric polyesters of my invention.

I mentioned hereinbefore that in reacting the monohydric polyesters of polyhydric alcohols with the cyclic polycarboxylic acids of my invention, the acids may be employed either as such or, conveniently, in the form of their anhydrides.

One example of an anhydride suitable for the preparation of neutral monomeric esters of my invention is found in the product of Diels-Alder condensation of maleic anhydride and 1,2-dihydrophthalic acid as follows:

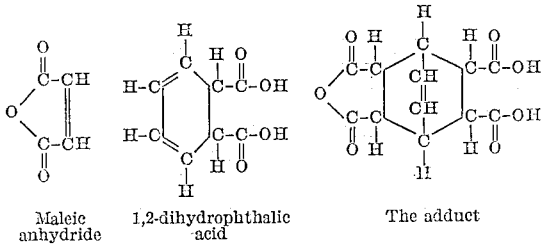

Maleic anhydride    1,2-dihydrophthalic acid    The adduct

This anhydride, commonly referred to as being the "adduct" of maleic anhydride and 1,2-dihydrophthalic acid, may be defined as the monoanhydride of endoethylene-hexahydropyromellitic acid.

Another representative example of an anhydride suitable for the production of neutral monomeric esters of my invention is the dianhydride of 1,2,4,5-benzene tetracarboxylic (pyromellitic) acid, hereinafter referred to as pyromellitic anhydride.

In the example of esterification (Example 1) which follows, pyromellitic anhydride is employed to secure neutral monomeric tetra-esters of pyromellitic acid.

*Example 1.*—Tall oil fatty acids of low rosin content, containing approximately 50% by weight oleic acid, 40% linoleic acid, 4% linolenic acid and 6% rosin acids, and characterized by a molecular weight of 284, an acid number of 197 and an iodine number of 130, are reacted in the amount of 454.4 g. with 65.4 g. of 95% glycerol. The reaction is effected at 230° C. with stirring in an inert atmosphere (e. g. in carbon dioxide) until the theoretical quantity of water has evolved (in about 4 hours), whereupon the reaction mixture is cooled to 150° C. An amount equal to 23.6 g. of 92.5% pyromellitic anhydride is added to the cooled mixture, which is then heated to 230° C. and held at that temperature for about 5 hours. Upon filtering, the final product is found to be a yellowish oil of medium viscosity of the order of 2 poises and upwards at 25° C. It has the following characteristics: acid number=8.0; saponification number= 210; hydroxyl number=14; color=9 to 11 (Gardner); iodine number=115.

As mentioned hereinbefore, another preferred way of preparing improved drying oils of my invention is that of effecting ester interchange or alcoholysis of triglycerides of drying and semi-drying oils with a polyhydric alcohol having at least 3 hydroxyl groups to obtain monomeric monohydric polyesters, and reacting these latter with a cyclic polycarboxylic acid having at least four carboxyl groups in a molecule. Any of the known drying and semi-drying oils of animal or vegetable origin, such as linseed oil, tung oil, oiticica oil, perilla oil, soybean oil, dehydrated castor oil, various fish oils, e. g., sardine and menhaden oils, walnut oil, hempseed oil and the like, as well as "copolymer oils" obtained by reacting drying oils with polymerizable olefins and diolefins, provided that every one of these oils have an iodine number of at least 120, may be utilized for ester interchange with polyhydric alcohols having at least three hydroxyl groups per molecule.

Ester interchange is effected by heating any of the aforementioned oils with a polyhydric alcohol in a mol ratio of at least 2 mols of the oil to 1 mol of the alcohol at a temperature from about 200° to about 250° C. for about 1 to 4 hours in the presence of from 0.01 to 0.1% by weight of a basic catalyst, such as an alkali metal hydroxide, e. g., NaOH and KOH, litharge, lime, and calcium naphthenate. The resulting mixture is an equilibrium mixture of monomeric esters of a polyhydric alcohol and the several monocarboxylic unsaturated fatty acids of the oil. All of those esters which contain more than one hydroxyl group per molecule, together with the unreacted polyhydric alcohol, should be substantially eliminated from the ester interchange reaction mixture to prevent cross-linking upon contact of the ester mixture with a cyclic polycarboxylic acid having at least four carboxyl groups in the molecule, and to avoid the consequent formation of an insoluble, infusible polymer separating as a solid, or a gel, and having no commercial value. This separation of monomeric esters with more than one hydroxyl group per molecule from the monohydric esters in the ester interchange product mixture may be effected by molecular distillation, or by dissolving the product mixture in appropriate solvents and selectively absorbing those constituents which have more than one hydroxyl group per molecule in a column containing adsorptive materials such as silica gel, clay or the like. Either of these two procedures will ultimately furnish a product fraction substantially consisting of monomeric monohydric polyesters of a polyhydric alcohol and monocarboxylic unsaturated fatty acids.

Upon separation, the monomeric monohydric polyester fraction is reacted with a cyclic polycarboxylic acid containing at least four carboxyl groups, or with its anhydride, in stoichiometrical amounts, by heating at about 200–250° C. to a low acid number of less than 10 until evolution of water has stopped. The resulting oil is a neutral monomeric ester containing at least eight unsaturated fatty acid groups per molecule, and because of this multiplicity of fatty acid groups, it possesses remarkable fast-drying characteristics comparable to those of the conventional full-drying oils, such as linseed oil, and superior to those of semi-drying oils, such as soybean oil.

A basic catalyst must be employed when neutral monomeric esters of my invention are to be prepared by resorting to ester interchange of drying and semi-drying oils with a polyhydric alcohol having at least three hydroxyl groups to produce first the intermediate mixture of esters, from which the monomeric monohydric polyester fraction required for the reaction with a cyclic polycarboxylic acid containing at least four carboxyl groups may be separated by molecular distillation or by fractionation with the aid of selective solvents and adsorbents. Furthermore, similarly to the method of direct esterification described hereinbefore, the heating of the reactants is preferably effected in the atmosphere of an inert gas such as carbon dioxide or nitrogen to prevent the possibility of oxidation of the double bonds in the fatty acid chains of the neutral monomeric ester product and the consequent objectionable discoloration (darkening) thereof.

The following Examples 2 to 7 describe the preparation of neutral monomeric esters of my invention, teach how to practice it with success and bring out its characteristic features.

It is to be understood, however, that these examples are merely illustrative of the invention and are by no means limitative of the scope thereof except as defined in the claims.

*Example 2.*—This test is made in order to show that, under the particular temperature conditions between about 200° to about 250° C., satisfactory ester interchange, yielding a monomeric monohydric polyester of a polyhydric alcohol having at least three hydroxyl groups per molecule, by substitution of at least two of these hydroxyl groups by radicals of monocarboxylic unsaturated fatty acids of a drying or a semi-drying oil, is not feasible in the absence of a catalyst.

0.133 mol of soybean oil is heated for about 3½ hours at 230° C. with 0.066 mol of 95% pure glycerol in a flask, with a stream of carbon dioxide gas bubbling through the flask to exclude air oxygen. The mixture remains cloudy, indicating that phase homogeneity is not attained. When this cloudy mixture is finally reacted with pyromellitic anhydride (0.05 mol) by heating to 230° C., with a stream of carbon dioxide gas bubbling through and with vigorous stirring, a solid product is formed in an amount nearly equal to the combined weight of pyromellitic anhydride and initial glycerol. This solid is a polymer resulting from the cross-linking of pyromellitic anhydride with free glycerol and a small proportion of soybean oil monoglyceride.

*Example 3.*—In this example confirming the effective role of a basic catalyst in the ester interchange leading to the formation of monomeric monohydric polyesters of polyhydric alcohols, the same amounts and similar conditions are employed as in Example 2, except for the application of sodium hydroxide as a catalyst which is used in an amount equal to 0.1% by weight. The product mixture, after an initial cooking for 2 hours at 230° C., is neutralized with sulfuric acid, and then reacted at 230° C. with 0.05 mol of pyromellitic anhydride in an atmosphere of carbon dioxide with continuous stirring. A small amount of a solid is left undissolved at the bottom of the flask after 7 hours of heating. The analysis of this solid shows that it is a cross-linked polymer of pyromellitic anhydride with glycerol and soybean oil monoglyceride. The oil above the solid is filtered and fractionated in a clay column.

The petroleum ether fraction amounting to about 80–85% of the oil, has an acid number of 1.5, and dries tack-free faster than the original soybean oil.

*Example 4.*—Separation of the monohydric ester (diglyceride) from other constituents of the ester interchange reaction product mixture, i. e., from glycerol and monoglyceride, by means of a water wash being unsatisfactory because of serious emulsion difficulties accompanied by losses of the product, molecular distillation or fractionation in a column filled with adsorptive materials is to be preferred as a purification method. The present example is an illustration of such a fractionation of the ester interchange product mixture in a clay column.

Diglyceride is prepared by heating 19.3 g. (0.2 mol) of 95.8% pure glycerol, 354 g. (0.4 mol) of soybean oil and 0.1% by weight of NaOH catalyst in a flask to 230° C. for 3 hours. The heating is done while a stream of carbon dioxide is bubbled through with vigorous stirring. Upon neutralizing the product mixture with $H_2SO_4$, the resulting pale yellow fluid is fractionated in a clay-filled column with the aid of the following succession of solvents: Petroleum ether, benzene, ethyl ether, acetone, alcohol and water. By analysis, the fractions eluted by each solvent are successively richer in polyhydric alcohols. The petroleum ether fraction equal to about 82% of the total product and essentially free from polyhydric alcohols is reacted with pyromellitic anhydride in an amount exactly equivalent to the glycerol content (calculated as diglyceride). After being heated for 4 hours at 230° C., the product has the appearance of a typical drying oil, such as linseed oil, and dries tack-free much faster than the original soybean oil.

I have found that, by using an excess of oil over the polyhydric alcohol in the ester interchange preparation of monomeric monohydric polyesters of polyhydric alcohols to be converted to neutral monomeric esters of cyclic polycarboxylic acids of the present invention, it is possible to secure a substantial predominance of the monomeric monohydric polyesters of polyhydric alcohol by virtue of the law of mass action, and that the unreacted excess of oil, e. g., drying oil or semi-drying oil, need not be separated from the monomeric monohydric polyester product prior to the reaction with the cyclic polycarboxylic acid. Instead of the molecular distillation of the ester interchange product, or of the selective fractionation thereof in a column containing adsorptive materials as indicated hereinabove, a mere filtration of the final product obtained by reacting the ester interchange product containing the unreacted excess oil with a cyclic polycarboxylic acid, or its anhydride, will yield a satisfactory synthetic drying oil product.

Surprisingly enough, an excess of from 10 to 50% or even more of a drying or a semi-drying oil may be present in the improved drying oil of my invention without adversely affecting its drying characteristics, which are considerably better than the drying characteristics of the original oil. This finding constitutes an important discovery and permits of effecting a substantial economy in the preparation of drying oils for surface-coatings.

The following Example 5 is typical of the preparation of my new improved drying oil from pyromellitic anhydride, glycerol and a semi-drying oil such as soybean oil in the presence of a 10% excess of this latter:

*Example 5.*—390 g. of soybean oil (0.4 mol + 10% excess), 19.25 g. of 95.8% pure glycerol (0.2 mol) and .394 g. of NaOH (0.1%) are heated in a flask for about 3 hours at 230° C. with a stream of $CO_2$ bubbling through the reaction liquid with vigorous stirring. The NaOH catalyst is not neutralized, as eventually a bare deficiency of pyromellitic anhydride is desired to insure a low acid number of the final drying-oil product. Thereupon a portion of the resulting product mixture (124.2 g.) containing 113.3 g. of soybean oil diglyceride and 10.9 g. of unreacted soybean oil is combined with 9.97 g. of pyromellitic anhydride, an amount exactly equivalent to the hydroxyl content of the diglyceride. This mixture is heated to 230° C. in the atmosphere of carbon dioxide, with stirring. After 4 hours the product mixture is filtered, leaving less than half the amount of solid on the filter as compared with Example 3 where an excess of soybean oil is not used. The resulting monomeric soybean oil tetra-ester of pyromellitic acid (soybean oil diglyceride pyromellitate) dries more rapidly than linseed oil to an excellent, hard film. The acid number of this pyromellitate is equal to approximately 6.5; its saponification number is 238. It is also noted that attempts of drying some of the diglyceride product mixture, without reacting it with pyromellitic anhydride, result in an incomplete drying in the manner of unmodified soybean oil; in other words, that the diglyceride of a semi-drying oil does not dry any faster than the semi-drying oil. When the remaining diglyceride product mixture is fractionated in a clay column, the petroleum ether fraction is found to be non-drying. The subsequently obtained benzene, ethyl ether, acetone and alcohol fractions are likewise non-drying. Hence it is concluded that the improvement in drying rates is the result of formation of a neutral tetra-ester of pyromellitic acid and is not induced by the presence of some unconverted diglyceride, if any, or by the physical treatment of this diglyceride prior to the formation of neutral tetra-ester.

*Example 6.*—This example illustrates the preparation of monomeric neutral esters of the present invention by reacting the monoanhydride of endoethylene hexahydropyromellitic acid ("the adduct") and soybean oil diglyceride. The diglyceride is prepared as shown in Example 3 by heating together 1 mol of glycerol with 2 mols of soybean oil in the presence of NaOH as a catalyst. The adduct is obtained by reacting maleic anhydride dissolved in a suitable solvent, e. g., dioxane, with 1,2-dihydrophthalic acid for about 2–3 hours and refluxing the resulting mixture for an additional 2 to 3 hours. After the completion of refluxing, the solvent is taken overhead, and the adduct recovered and purified in a suitable manner. Next, 1 mol of the adduct is reacted with 4 mols of diglyceride for about 7 hours at a temperature which ranges from 160 to 244° C. The resulting product is a semi-viscous oil, having an average neutralization number of 2.3, an acetyl value of 20 and a viscosity of 10.7 poises at 25° C. It dries tack-free more rapidly than linseed oil and sets hard just as fast as linseed oil.

My next example illustrates the preparation of neutral monomeric esters of my invention by direct esterification of a polyhydric alcohol having more than 3 hydroxyl groups with monocarboxylic unsaturated fatty oil acids, and by reacting the resulting monomeric monohydric polyester with a cyclic polycarboxylic acid having at least 4 carboxyl groups.

*Example 7.*—Soybean oil fatty acids in an amount equal to 675.4 g. (2.4 mols) and 101.1 g. (0.735 mol) of pentaerythritol are heated in a flask provided with a condenser and a "water-by-distillation" trap to 230° C. and held at this temperature for about 7 hours, while an inert gas such as nitrogen is bubbled through the reaction flask, and water which separates in the reaction is removed. One hour prior to the completion of reaction, 30 milliliters of xylene and 10 milliliters of toluene are added to the hot reaction mixture in order to strip off the remaining water.

The resulting material, a mixture of the tetraester of pentaerythritol and a monomeric monohydric triester of pentaerythritol in which all the hydroxyl groups but one have been esterified by soybean oil fatty acids, is cooled to room temperature, whereupon 25.4 g. (0.1 mol) of pyromellitic acid is added thereto, and the mixture is heated rapidly to 230° C. and held there from 6 to 7 hours, while the water coming over is drawn off and xylene and toluene are allowed to reflux until the last hour, when the two solvents are drawn off. Altogether from 6 to 7 milliliters of water are withdrawn. No catalyst is used in either reaction stage: (1) preparing monohydric triester of pentaerythritol and (2) reaction of this latter with pyromellitic acid. The final product is filtered at 230° C. through a steam-heated Buchner funnel into a suction flask on a steam-heated hot plate. Only 1.3 g. of solid matter is recovered from the precipitate retained on filter paper, after washing with benzene followed by petroleum ether and drying. After the completion of filtration, the suction flask is stoppered and vacuum is applied at 3 mm. pressure to strip off any of the remaining solvent.

The final monomeric neutral pentaerythritol "trisoyate" tetraester of pyromellitic acid is a reddish-brown oil of medium viscosity having the following characteristics:

Color (Gardner) _____ 14–15.
Viscosity _____ 2.25 poises at 25° C.
Acid number _____ 5.4–5.5.
Saponification number _____ 208–209.
Hydroxyl number _____ 15.
Iodine number _____ 115.

A sample of this neutral monomeric tetraester oil is compounded with lead naphthenate and cobalt naphthenate until the final contents of these additives are 0.3% and 0.03% respectively, and compared at room temperature for air-drying rates with a similarly compounded alkali-refined linseed oil. The test data are tabulated as follows:

|  | Linseed Oil | Tetrapyromellitate Oil |
|---|---|---|
|  |  | *Hours* |
| Set to touch | 3½ hrs | 4 |
| Dust free | 4½ hrs | 6½ |
| Tack free | More than 20 hrs | 9 |

It is observed that the tetrapyromellitate oil displays no after-tack characteristic of the linseed oil, and in drying apparently passes through an initial induction period, which can be shortened by adding the driers to the pyromellitate oil well ahead of its actual application in surface-coatings. Thus similar samples of alkali-refined linseed oil and tetrapyromellitate oil synthesized in accordance with my invention are compounded with lead and cobalt naphthenate driers, in the same proportions as shown above, 9 days prior to the test of comparing their air-drying rates at a somewhat lower temperature. The results are as follows:

|  | Linseed Oil | Tetrapyromellitate Oil |
|---|---|---|
|  | Hours | Hours |
| Set to touch | 4¼ | 4¾ |
| Dust free | 5½ | 6½ |
| Tack free | 24 | 7 |

The yield of the ultimately desired monomeric neutral ester oil may be as high as 95% and even better, provided the monohydric polyesters to be reacted with the cyclic polycarboxylic acid having at least 4 carboxyl groups are substantially freed of unreacted polyhydric alcohol and esters other than the monohydric ones.

The acid number of the final drying-oil product of my invention may be as high as 20 without affecting the remarkable drying characteristics thereof. For practical reasons, however, it will be preferred to heat the reactants (cyclic polycarboxylic acids and monohydric polyesters) to a much lower acid value of about 5 or less, in order to avoid incompatibility with pigments upon eventual formulation of surface-coating mixtures.

Ordinarily the final neutral monomeric ester product does not require bodying; however, if so desired because of the particular specifications of the case, it may be bodied.

The entire process of manufacturing the monomeric neutral esters of my invention suitable as drying oils is extremely simple and does not require the use of complicated equipment. Either open or closed kettles may be employed for cooking the ingredients. Sublimation losses are nonexistent.

The hard, durable films formed by these neutral ester oil products are characterized by a good resistance to water. As mentioned already, the high drying rates of my improved drying oils result substantially from the presence of at least eight unsaturated fatty-acid groups in the molecule of the monomeric neutral ester product, and do not result from the unsaturation of the cyclic polycarboxylic acids, as is the case with synthetic drying oils reported in the art and based, e. g., on maleic or fumaric acids.

When contrasted with the failure of cyclic dicarboxylic acids, such as phthalic acids, to improve materially the drying rates of various full-drying and semi-drying oils, the polycarboxylic acids of my invention, as exemplified by pyromellitic acid in the form of its dianhydride, are remarkably superior and effective as a means for securing more rapidly drying products with these oils. This may be seen from the following table which contains comparative test data for: (1) an oil-like diester of orthophthalic acid obtained by cooking soybean oil diglyceride with phthalic anhydride at 230° C. for about 4 hours; (2) a neutral tetraester of pyromellitic acid of the present invention obtained under identical conditions from soybean oil diglyceride and pyromellitic anhydride.

|  | Di-ester of o-Phthalic Acid | Tetraester of Pyromellitic Acid |
|---|---|---|
| Acid No | 10 | 5. |
| Saponification No | 246 | 242. |
| Iodine No | 112 | 111. |
| Color (Gardner) | 11 | 9–10. |
| Viscosity (in Poises) | 1.25 | 2.75. |
| Drying time: |  |  |
| Set to touch | 5¼ hrs | 4 hrs. |
| Dust free | 6¾ hrs | 4¾ hrs. |
| Tack Free | Not dry after 1 wk | 7¾ hrs. |
| Hard | Does not dry hard | 28 hrs. |

It is observed from this table that the phthalic acid product is not a satisfactory drying oil as it does not dry to a hard, tack-free film. Its drying rate is approximately the same as that of the corresponding soybean oil. On the contrary, the tetraester of pyromellitic acid prepared in accordance with my invention dries at about the same rate as linseed oil and forms hard, durable, water-resistant films in about the same length of time (linseed oil film dried in 32 hrs.).

At this point, I wish to point out that non-drying fatty oils of vegetable and animal origin likewise can be treated with cyclic polycarboxylic acids having at least 4 carboxyl groups, e. g., with pyromellitic acid, or pyromellitic anhydride, in accordance with the process of this invention. When so treated, they yield improved oils of a higher viscosity than the original non-drying oil, and are suitable as special-purpose lubricants for a variety of applications.

In conclusion, it is to be understood that many modifications may be made in the preparation of the product of the present invention, without substantially departing from the spirit or the scope thereof, and that the examples given hereinabove are merely illustrative of the invention and do not restrict it except as defined in the appended claims.

I claim:

1. A neutral monomeric ester of a cyclic polycarboxylic acid, having the formula $A(COOY)_n$ wherein A is the hydrocarbon-ring residue of said polycarboxylic acid, and Y is the radical of a monomeric polyester of a polyhydric alcohol having at least 3 hydroxyl groups, all of these groups but one having been esterified by monocarboxylic unsaturated fatty acids, said unesterified hydroxyl group being the only functional group in said monomeric polyester capable of reacting with a carboxyl group, and wherein $n$ is an integer of at least 4.

2. A neutral monomeric ester as defined in claim 1, wherein said organic polycarboxylic acid is a dianhydride-forming polycarboxylic acid.

3. A neutral monomeric ester as defined in claim 1, wherein the number of said monocarboxylic unsaturated fatty acid residues in each molecule of said neutral monomeric ester of said cyclic polycarboxylic acid is not less than 8.

4. A neutral monomeric ester as defined in claim 1, wherein said monocarboxylic unsaturated fatty acids are semi-drying oil fatty acids.

5. A neutral monomeric ester as defined in claim 1, wherein said cyclic polycarboxylic acid is an aromatic tetracarboxylic acid.

6. A neutral monomeric ester as defined in claim 1, wherein said cyclic polycarboxylic acid is pyromellitic acid, said polyhydric alcohol is glycerol and said monocarboxylic unsaturated fatty acids are soybean oil fatty acids.

7. A neutral monomeric ester as defined in claim 1, wherein said cyclic polycarboxylic acid is endoethylene hexahydropyromellitic acid, said polyhydric alcohol is glycerol and said monocarboxylic unsaturated fatty acids are soybean oil fatty acids.

8. A neutral monomeric ester is defined in claim 1, wherein said cyclic polycarboxylic acid is pyromellitic acid, said polyhydric alcohol is pentaerythritol and said monocarboxylic unsaturated fatty acids are soybean oil fatty acids.

9. A process for the manufacture of a neutral monomeric ester of a cyclic polycarboxylic acid, having the formula $A(COOY)_n$ wherein A is the hydrocarbon-ring residue of said polycarboxylic acid, and Y is the radical of a monomeric polyester of a polyhydric alcohol of at least 3 hydroxyl groups, all of these groups but one having been esterified by monocarboxylic unsaturated fatty acids, said unesterified hydroxyl group being the only functional group in said monomeric polyester capable of reacting with a carboxyl group, and wherein $n$ is an integer of at least 4, said process comprising the steps of heating the polyhydric alcohol containing at least 3 hydroxyl groups with a fatty oil having an iodine number of at least about 120 at a temperature from about 200° to about 250° C. in the presence of a basic catalyst, and reacting the resulting product mixture with a cyclic polycarboxylic acid having at least 4 carboxyl groups in the molecule in stoichiometrical amounts at a temperature from about 200° to about 250° C.

10. A process as defined in claim 9, wherein said fatty oil having an iodine number of at least about 120 is present in excess over the polyhydric alcohol.

11. A process as defined in claim 9, wherein said polyhydric alcohol is glycerol and said fatty oil is a semi-drying oil.

12. A process as defined in claim 9, wherein said polyhydric alcohol is glycerol, said fatty oil is a semi-drying oil and said cyclic polycarboxylic acid is pyromellitic acid.

13. A process for the manufacture of a neutral monomeric ester of a cyclic polycarboxylic acid, having the formula $A(COOY)_n$ wherein A is the hydrocarbon-ring residue of said polycarboxylic acid, and Y is the radical of a monomeric polyester of a polyhydric alcohol of at least 3 hydroxyl groups, all of these groups but one having been esterified by monocarboxylic unsaturated fatty acids, said unesterified hydroxyl group being the only functional group in said monomeric polyester capable of reacting with a carboxyl group, and wherein $n$ is an integer of at least 4, said process comprising the steps of heating the polyhydric alcohol containing at least 3 hydroxyl groups with a fatty oil having an iodine number of at least about 120 at a temperature from about 200° to about 250° C. in the presence of a basic catalyst, separating monomeric polyesters of said polyhydric alcohol in which all but one hydroxyl groups have been esterified by monocarboxylic unsaturated fatty acids of said fatty oil from the resulting reaction mixture, and reacting said monomeric polyesters of said polyhydric alcohol with a cyclic polycarboxylic acid having at least 4 carboxyl groups in the molecule in stoichiometrical amounts at a temperature from about 200° to about 250° C.

14. A process for preparing neutral monomeric esters of a cyclic polycarboxylic acid, having the formula $A(COOY)_n$ wherein A is the hydrocarbon-ring residue of said cyclic polycarboxylic acid, and Y is the radical of a monomeric polyester of a polyhydric alcohol having at least 3 hydroxyl groups, all of these groups but one having been esterified by monocarboxylic unsaturated fatty acids, said unesterified hydroxyl group being the only functional group in said monomeric polyester capable of reacting with a carboxyl group, and wherein $n$ is an integer of at least 4, said process comprising the steps of heating at a temperature from about 200° to about 250° C. a monocarboxylic unsaturated fatty acid containing from 16 to 18 carbon atoms in a molecule with a polyhydric alcohol containing at least 3 hydroxyl groups, forming a product comprising monomeric polyesters of said polyhydric alcohol in which all but one hydroxyl groups have been esterified by said monocarboxylic unsaturated fatty acid, and reacting said product with a cyclic polycarboxylic acid having at least 4 carboxyl groups in the molecule in stoichiometrical amounts at a temperature from about 200° to about 250° C.

15. A process as defined in claim 13, wherein said polyhydric alcohol is glycerol.

16. A process as defined in claim 13, wherein said polyhydric alcohol is pentaerythritol, said cyclic polycarboxylic acid is pyromellitic acid and said monocarboxylic unsaturated fatty acids are soybean oil fatty acids.

WILLIAM E. ELWELL.

REFERENCES CITED

The following references are of record in the file of this patent:

FOREIGN PATENTS

| Number | Country | Date |
|--------|---------|------|
| 419,604 | Great Britain | 1934 |